(12) United States Patent
Jerolm

(10) Patent No.: US 11,489,697 B2
(45) Date of Patent: Nov. 1, 2022

(54) TRANSMISSION OF DATA ON A LOCAL BUS

(71) Applicant: WAGO Verwaltungsgesellschaft mbH, Minden (DE)

(72) Inventor: Daniel Jerolm, Bad Essen (DE)

(73) Assignee: WAGO Verwaltungsgesellschaft mbH, Minden (DE)

(*) Notice: Subject to any disclaimer, the term of this patent is extended or adjusted under 35 U.S.C. 154(b) by 338 days.

(21) Appl. No.: 16/694,116

(22) Filed: Nov. 25, 2019

(65) Prior Publication Data
US 2020/0092130 A1    Mar. 19, 2020

Related U.S. Application Data

(63) Continuation of application No. PCT/EP2018/062956, filed on May 17, 2018.

(30) Foreign Application Priority Data

May 24, 2017 (DE) ...................... 10 2017 208 825.7

(51) Int. Cl.
*H04L 12/403* (2006.01)
*H04L 12/40* (2006.01)
*H04L 12/42* (2006.01)

(52) U.S. Cl.
CPC ........ *H04L 12/403* (2013.01); *H04L 12/4015* (2013.01); *H04L 12/422* (2013.01); *H04L 2012/4026* (2013.01)

(58) Field of Classification Search
CPC ...... G05B 2219/31155; H04L 12/4015; H04L 12/403; H04L 12/42; H04L 12/422;
(Continued)

(56) References Cited

U.S. PATENT DOCUMENTS 5,472,347 A    12/1995  Nordenstrom et al.
6,728,262 B1 *  4/2004  Woram .............. G05B 19/4186
                                                370/466
(Continued)

FOREIGN PATENT DOCUMENTS

CN    101690010 A    3/2010
CN    102360206 A    2/2012
(Continued)

OTHER PUBLICATIONS

Chinese Office Action dated May 27, 2021 in corresponding application 201880034566.2.

*Primary Examiner* — Stephen J Clawson
(74) *Attorney, Agent, or Firm* — Muncy, Geissler, Olds & Lowe, P.C.

(57) ABSTRACT

A method for operating a local bus, in particular a ring bus, including data bus participants, as well as a local bus master are described. The method comprises transmitting a first identifier of a cycle frame, the first identifier defining the beginning of the cycle frame; transmitting process data and management data over the local bus, the process data and management data being transmitted within the cycle frame, at least one isochronous data packet containing the process data being transmitted in a first time interval for the first identifier, and, if management data is transmitted within the cycle frame, this management data is transmitted separately from the process data.

18 Claims, 5 Drawing Sheets

(58) Field of Classification Search
CPC ........... H04L 12/423; H04L 2012/4026; H04L 2012/40267; E02D 2600/20; E02D 2600/40; E02D 29/0225; E02D 29/025
See application file for complete search history.

(56) References Cited

U.S. PATENT DOCUMENTS

| | | | |
|---|---|---|---|
| 7,760,753 B2 | 7/2010 | Schultze et al. | |
| 7,836,224 B2 | 11/2010 | Oster et al. | |
| 8,144,718 B2 | 3/2012 | Schwenkel et al. | |
| 8,169,974 B2 | 5/2012 | Pratt, Jr. et al. | |
| 8,170,066 B2 | 5/2012 | Kynast et al. | |
| 8,291,142 B2 | 10/2012 | Kuschke et al. | |
| 8,406,248 B2 | 3/2013 | Pratt, Jr. et al. | |
| 8,554,978 B2 | 10/2013 | Buesching et al. | |
| 2002/0040348 A1* | 4/2002 | Dittrich | G01D 9/005 705/52 |
| 2003/0012566 A1* | 1/2003 | Kindaichi | H04N 1/2125 396/56 |
| 2003/0161332 A1* | 8/2003 | Ohno | H04L 61/2038 370/402 |
| 2003/0222843 A1* | 12/2003 | Birmingham | H04N 21/443 348/E5.006 |
| 2005/0232296 A1* | 10/2005 | Schultze | H04L 12/43 370/442 |
| 2006/0092858 A1 | 5/2006 | Kynast et al. | |
| 2011/0202700 A1* | 8/2011 | Inoue | G06F 13/385 710/305 |

FOREIGN PATENT DOCUMENTS

| | | |
|---|---|---|
| CN | 162339047 A | 2/2012 |
| CN | 103441914 A | 12/2013 |
| DE | 102 06 904 A1 | 9/2003 |
| DE | 10 2004 050 423 A1 | 4/2006 |
| DE | 10 2004 050 424 A1 | 4/2006 |
| DE | 10 2008 018 633 A1 | 10/2009 |
| EP | 1 832 946 A1 | 9/2007 |
| ER | 1 585 266 A2 | 10/2005 |

* cited by examiner

TRANSMISSION OF DATA ON A LOCAL BUS

This nonprovisional application is a continuation of International Application No. PCT/EP2018/062956, which was filed on May 17, 2018, and which claims priority to German Patent Application No. 10 2017 208 825.7, which was filed in Germany on May 24, 2017, and which are both herein incorporated by reference.

BACKGROUND OF THE INVENTION

Field of the Invention

The present invention relates to the transmission of data on a local bus.

Description of the Background Art

Process data and management data are usually used in the context of automation systems but are not limited thereto.

Automation systems are used, in particular, to control industrial plants, buildings as well as means of transportation. Multiple sensors and actuators are usually necessary for controlling an automation system. They monitor and control the process carried out by the system. The different sensors and actuators of an automation system are often also referred to as automation devices.

These automation devices may either be connected directly to a controller of the automation system or they may be first connected to input and output modules, which are frequently also referred to as I/O modules. The latter may, in turn, be connected directly to the controller. The automation devices may be either integrated directly into the I/O modules, or they may be connected thereto via cables or wirelessly.

The control of an automation system is generally effectuated with the aid of one or multiple programmable logic controllers: PLCs. The PLCs may be arranged in an automation system hierarchically or decentrally. The PLCs have different power classes, so that they may take on control or regulation functions depending on their computing and storage capacity. In the simplest case, a PLC has inputs, outputs, an operating system (firmware) and an interface, via which a user program may be loaded. The user program defines how the inputs are to be connected depending on the outputs. The inputs and outputs may be connected to the automation devices and/or the I/O modules, and the process carried out by the automation system may be monitored or controlled based on the logic stored in the user program. The monitoring of the process is effectuated by the sensors and the control of the process by the actuators. The controller may also be referred to as a central controller or central unit and usually handles the control of at least one automation device or I/O module connected to the controller.

However, the direct connection of the automation devices to the at least one controller, or the direct connection of the I/O modules to the at least one controller, in the form of a parallel wiring, i.e. one cable is laid from each automation device or each I/O module to the higher-level controller, is extremely complex. In the case of parallel wiring, the cabling complexity increases in particular along with the degree of automation of an automation system. This is associated with enormous complexity in terms of engineering, installation, commissioning and maintenance.

For this reason, bus systems today are customarily used in automation engineering, with the aid of which the automation devices or the I/O modules may be connected to the controller. Such participants of a bus system are also referred to as bus participants. Because data is exchanged on the bus system, the bus participations are also frequently referred to as data bus participants. To further simplify the connection of the individual automation devices or I/O modules to the bus system, individual groups of automation devices or I/O modules today are often first combined with each other with the aid of a specialized local bus to form a local bus system, and at least one participant of this local bus is subsequently connected to the bus system connected to the controller. The local bus system can thus be distinguished from the bus system used to implemented the connection to the controller.

The participant of a group of local bus participants connected to the bus system of the controller is frequently also referred to as the local bus master. Alternatively, the designation head station of the local bus system is also used. Compared to other local bus participants, this local bus master may include other logic units, circuits or functionalities which are necessary for connection to the bus system of the controller. The local bus master itself may include a PLC. This participant may also have logic units and circuits for converting between the two bus systems. The local bus master may therefore also be designed as a gateway or bus converter and ensure a conversion of the data present in the format of the one bus system into the format of the local bus system and vice versa. The local bus master usually specializes in the connection of the local bus to the higher-level bus, although this is not absolutely necessary.

The local buses used are customarily tailored to the special application requirements of the automation devices or I/O modules or they take into account the special hardware design thereof. The groups of automation devices or I/O modules of the local bus system usually form a subgroup of the automation system for carrying out a special task in the process carried out by the automation system. The data exchanged on the buses for the process is also frequently referred to as local bus data or process data, because this data contains information for regulating or controlling the process carried out by the automation system. This data may include, among other things, measured data, control data, status data and/or other information that induces regulation or control actions on the data bus participants within a precisely defined period of time or a precisely defined point in time. According to the bus protocol used, other data may be placed in front of (header) or appended to (tail) this data. This other data may contain information relating to the data or information relating to an internal communication on the local bus. A plurality of different information is known, which may be placed in front of or appended to the data according to the bus protocol used. Data also exists which induces a control, regulation or programming of the data bus participants outside a defined period of time or outside a precisely defined point in time. In the context of automation systems, process data may also frequently be referred to as cyclical data, because the process controlled or regulated in the automation system is dependent on cyclical process data which permits the data bus participants to effectuate control and/or regulation actions of the or at the actuators and sensors connected to the data bus participants. In contrast, management data is used to program the data bus participants or, for example, to request their error messages, status, etc.

A ring bus is a specialized form of a local bus, known, for example, from U.S. Pat. No. 5,472,347 A. In a ring bus, the data bus participants, for example the automation devices or I/O modules, are each connected to their directly adjacent data bus participants, and data is forward in sequence from one data bus participant to the next. The data transmitted on the local bus may also be referred to as local bus data. Therefore, the data is not sent to all data bus participants at the same time but rather sequentially, one data bus participant receiving data from its preceding data bus participant and forwarding data to its subsequent data bus participant. The data bus participant may process the data received between the receipt and the forwarding of the data. Once the data has reached the last data bus participant in the sequence, the data is returned sequentially from the last data bus participant back to the first data bus participant. The return may take place through all data bus participants or pass them by with the aid if a bypass line. The ring bus therefore has a downstream flow and an upstream flow of data. The data in a ring bus is usually transmitted in the form of data packets, which pass through all data bus participants.

In a ring bus, the data packet is forwarded from one data bus participant to the next. A data bus participant always receives only one part of the data packet from its preceding data bus participant at any given time. Once the data contained in this part has been processed by the data bus participant, the part is forwarded to the subsequent data bus participant, and a new part of the data packet is simultaneously received from the preceding data bus participant. In this way, all parts of the data packet sequentially pass through all data bus participants.

SUMMARY OF THE INVENTION

It is therefore an object of the present invention to provide a method as well as a local bus master for the improved time management in ring bus systems.

A method according to an exemplary embodiment of the invention for operating a local bus including data bus participants is described, the local bus being, in particular, a ring bus. The method comprises the step of transmitting a first identifier of a cycle frame, the first identifier defined the beginning of the cycle frame. A cycle frame may be, for example, a recurring (cyclical), preferably equidistant, time interval, within which data is transmittable on the local bus. The cycle frame includes, for example, at least one first identifier, which may also be referred to as a start of cycle (SOC) identifier, and which defines, with a subsequent first identifier, a time range for transmitting the data. Multiple first identifiers of consecutive cycle frames are advantageously spaced equidistantly apart in time. The first identifier may contain a unique bit pattern SOC. When this bit pattern is detected by the data bus participants, the latter know that a cycle frame has begun, i.e. process data will hollow at specific time intervals with respect to the SOC, and management data will follow at non-specific time intervals with respect to the SOC. In the context of the invention, time may refer to the absolute time or to corresponding operating cycles.

The method according to the invention further comprises the step of transmitting the process data and management data over the local bus, the process data and management data being transmitted within the cycle frame. The process data is used on the data bus participants to induce a control and/or regulation of a process. For example, it controls the setpoint values for actuators connected to the data bus participants or regulates limit values for recorded sensor values. The management data includes data used to manage the data bus participants, for example it contains the programming of the data bus participants or, for example, requests states. However, management data may also be used to initialize the local bus for the purpose of assigning addresses, for example, to the data bus participants or requesting the addresses thereof. Management data preferably does not contain any process data.

In the method according to the invention, at least one isochronous data packet, which includes the process data, is transmitted in a first time interval for the first identifier, and if management data is to be transmitted within the cycle frame, this management data is to be transmitted separately from the process data. That is, the management data is not transmitted together with the process data in the at least one isochronous data packet but is transmitted within the same cycle frame. Management data and process data are not mixed.

In other words, the first identifier is first transmitted from the local bus master to the local bus. The first data bus participant receives the first identifier and has knowledge of the fact that a cycle frame begins. The first data bus participant then forwards the first identifier to the subsequent data bus participant, etc. after a preferably defined, predetermined or fixed time, e.g. twelve cycles. The first predetermined time is therefore, for example, the specified or fixed delay by a data bus participant for forwarding each symbol to the subsequent data bus participant. That is, it may be said that the first identifier is transmitted on the local bus because this first identifier passes through all data bus participants of the local bus. The local bus master transmits the first symbol of the at least one isochronous data packet in a first time interval for the first identifier. This symbol is also received by the first data bus participant and is forwarded to the next data bus participant, etc. after a defined, predetermined or fixed time. The same thing happens with the additional symbols of the at least one isochronous data packet. That is, it may be said that the at least one isochronous data packet is transmitted on the local bus because all parts of the at least one isochronous data packet pass through all data bus participants.

If the defined, predetermined time is constant at all data bus participants, the time interval between the first identifier and the first symbol of the at least one isochronous data packet thus also always remains the same. It may also be said that the first identifier and the parts of the at least one isochronous data packet pass through the local bus, i.e. the data bus participants, at a constant speed. If the local bus master transmits management data separately from the at least one isochronous data packet, this data may be transmitted either chronologically before the at least one isochronous data packet or chronologically after the at least one isochronous data packet, provided that the isochronous data packet is not contiguous to the first identifier or a subsequent first identifier. The management data is also received by the data bus participants and forwarded to the next data bus participant, etc. after a defined, predetermined time. That is, it may be said that the management data is transmitted on the local bus.

Due to the fact that process data and management data are transmitted together within a cycle frame, the advantage results that the communication with the data bus participants does not have to be interrupted when switching between isochronous process data and management data. It is furthermore also possible to change the programming of the data bus participants, for example for each isochronous data packet, namely in that the isochronous data packet is preceded by management data. A best possible time management may be ensured by transmitting isochronous process data and management data within a cycle frame without interrupting the communication.

The at least one isochronous data packet can include a second identifier, which is different from the first identifier. This identifier of the isochronous data packet may be a unique bit pattern IDE. The data bus participants know that, when this bit pattern occurs, isochronous data, i.e. process data, follows. The local bus master may be adapted to transmit this second identifier on the local bus in the first time interval of the first identifier, followed by the process data. The second identifier and the process data are each received by the data bus participants and forwarded to the next data bus participant, etc. at a defined, predetermined or fixed time, so that the isochronous data packet is transmitted on the local bus is this manner.

The management data can be transmitted in at least one asynchronous data packet instead of an isochronous transmission of the management data. An asynchronous data packet is transmitted only as needed, i.e. if management data to be transmitted is waiting. If no management data is available for transmission, no asynchronous data packets are transmitted within a cycle frame. A data packet is asynchronously transmitted when it does not always have to be in the same time interval as the first identifier from one cycle frame to the next cycle frame. Conversely, isochronous data packets must always be transmitted in the same time interval as the first identifier within each cycle frame. Both isochronous data packages and asynchronous data packets are preferably oriented to one clock signal of the local bus.

The asynchronous data packet may include a third identifier, which is offset with respect to the first identifier, i.e. the identifier which indicates the beginning of a cycle frame, and the second identifier which indicates an isochronous data packet. The third identifier may also be an associated bit pattern, which is known to the data bus participants, so that upon receiving the third identifier they know that an asynchronous data packet is present and that asynchronous data, i.e. management data, follows according to the third identifier. The local bus master may be adapted to transmit this third identifier on the local bus. The third identifier and the management data are each received by the data bus participants and forwarded to the next data bus participant, etc. at a defined, predetermined or fixed time, so that the asynchronous data packet is transmitted on the local bus is this manner.

The method further can comprise the step of ascertaining the first time interval. That is, the amount of time between the transmission of the first identifier and the transmission of the first symbol of the at least one isochronous data packet is ascertained. The first time interval is preferably determined based on the number of data bus participants and a predefined or calculated delay in the transmission of the process data.

The ascertainment may be effectuated, for example, by the local bus master. The first time interval preferably indicates the amount of time between the transmission of the first identifier and the transmission of the second identifier. If all data bus participants are adapted to have the particular symbol received present only for a constant time and to subsequently forward it to the next data bus participant, this time interval between the transmission and forwarding of the first identifier and the transmission and forwarding of the second identifier remains the same.

The amount of time allowed to pass between the transmission of the first identifier and the transmission of the first symbol of the at least one isochronous data packet can depend on when the process data contained in the isochronous data packet must be present at the data bus participants to carry out a control and/or regulation action. In particular, a preferably limited latency may be required. for example, the local bus master may have knowledge of when the process data must be present at the particular data bus participants so that all data bus participants may carry out control and/or regulation actions simultaneously or at least within a limited period of time. Based on this knowledge and the knowledge of how much time is required to transmit the isochronous data packet, which is dependent on the number of data bus participants, the local bus master may ascertain when the at least one isochronous data packet must be transmitted or when the first symbol of the at least one isochronous data packet must be transmitted so that all data bus participants have received their particular process data on time. Those skilled in the art are aware that the presence of the process data at the particular data bus participants is also dependent on the distribution of the process data within the at least one isochronous data packet.

The local bus master may be adapted to store the ascertained time interval. Moreover, the local bus master may be adapted to use the same time interval until the configuration of the local bus changes again, i.e. until data bus participants are added or removed. The local bus master may be adapted in such a way that it ascertains the time interval when the local bus is initialized for the first time. The local bus master may also be adapted to check the time interval in fixed time intervals or triggered by a configuration change of the local bus after the initialization. Alternatively, the first time interval may be calculated by an external program, for example on a desktop PC or on the PLC connected via a field bus.

The point in time at which the process data must be present at the data bus participants may also be referred to as the output point in time, because the process data is output at the outputs of the data bus participants at this point in time. For example, actuators may be controlled or regulated by the output of the process data at the outputs of the data bus participants. This output point in time may be fixedly predefined and have a second time interval of the first identifier. The second time interval defines the time which passes between the transmission of the first identifier by the local bus master and the output point in time. The second time interval is different for each data bus participant. The second time interval is determined for each data bus participant depending on the position of the data bus participant in the local bus. Each data bus participant is preferably notified of its individual second time interval with the aid of the management data.

The output point in time can be specified with the aid of an absolute time indication. In this case, the data bus participants all operate with a common time basis. For example, they are all synchronized to a timer. According to one advantageous embodiment, the first identifier contains a time stamp, which is evaluated by the data bus participants, for example to correct their own time basis.

According to a defined output point in time, a defined input point in time may also exist, which defines an input of process data at the inputs of the data bus participants. This input point in time may be, for example, the point in time at which the data bus participants receive values from the sensor connected to the data bus participants. The input point in time may be a third time interval removed from the transmission of the first identifier. The received values may also represent process data and may be requested from the data bus participants with the aid of another isochronous data packet within the cycle frame, so that the local bus master is able to forward the corresponding process data to a higher-level controller. The local bus master may be adapted, for example, to transmit another isochronous data packet on the local bus at a fourth time interval for the first identifier, the fourth time interval being ascertained based on the input point in time at the data bus participants, so that the additional isochronous data packet or parts of the isochronous data packet is/are present at the data bus participants at a time when they have already read the values from their inputs and are ready to write them to the additional isochronous data packet or the part of the additional isochronous data packet received by them.

The aforementioned object can also be achieved by a local bus master according to the invention of a local bus, in particular a ring bus, including data bus participants. The local bus master comprises a transmitter for transmitting a first identifier of a cycle frame, the first identifier defining the beginning of the cycle frame. The transmitter is adapted to transmit process data and management data over the local bus, the process data and management data being transmittable within the cycle frame. In the local bus master according to the invention, the transmitter is adapted to transmit an isochronous data packet containing the process data in a first time interval for the first identifier. If management data is transmitted within the cycle frame, the transmitter is adapted to transmit this management data separately from the process data. The transmitter may be, for example, a circuit, in particular a transceiver circuit. The circuit may be implemented in an application-specific integrated circuit (ASIC) or in a field-programmable (logic) gate arrangement (FPGA). The transmitter may also include an encoder, which encodes the data to be transmitted on the local bus. The transmitter may also include a modulator, which modulates the data to be transmitted on the local bus.

The transmitter is further adapted to transmit the management data in an asynchronous data packet.

The local bus master can further include an asertainer for ascertaining the first time interval based on an output point in time, which defines an output of process data at an output of the particular data bus participants, the output point in time being predefined in a second time interval for the first identifier.

The ascertainer is adapted to ascertain a fourth time interval for the first identifier based on an input point in time, which defines an input of process data at an input of the particular data bus participants. The input point in time is predefined or determined in a third time interval for the first identifier. The transmitter is adapted to transmit at least one additional isochronous data packet in the cycle frame in a fourth time interval for the first identifier. The additional isochronous data packet may be used to request the values at the inputs of the particular data bus participants. The local bus master may furthermore comprise a receiver for receiving process data.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
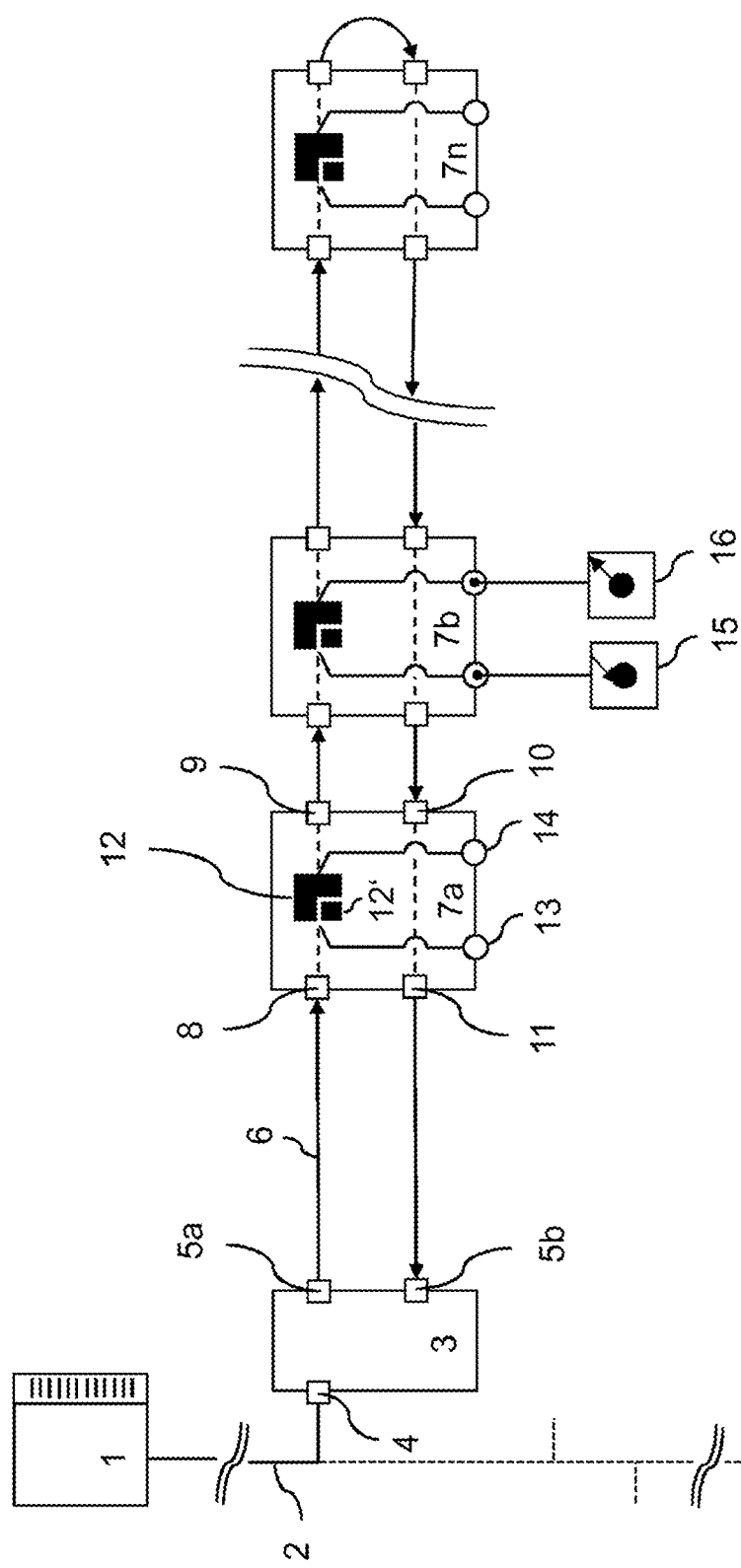
FIG. 1 shows a schematic block diagram of an example of an automation system, including a programmable logic controller, and an example of a ring bus.

FIG. 1 shows a schematic block diagram of an automation system. Those skilled in the art will understand that the illustrated automation system is only an example, and all elements, modules, components, participants and units belonging to the automation system may be provided with a different design and yet perform the basic functionalities described here.

The automation system illustrated in FIG. 1 includes a higher-level controller 1, which may be implemented, for example, with a programmable logic controller, PLC. A PLC 1 of this type is used, in principle, to control and regulate the process carried out by the automation system. However, PLCs 1 in automation systems today take on additional functions, such as the visualization, alerting and recording of all data relating to the process and, as such, PLC 1 acts as a human/machine interface. PLC 1 exists in different power classes, which have different resources (computing capacity, storage capacity, number and type of inputs and outputs and interfaces), which enable PLC 1 to control and regulate the process of the automation system. A PLC 1 usually has at least one modular structure and is made up of individual components, each of which performs a different task. A PLC 1 is usually made up of a central computing assembly (including one or multiple main processors and storage modules) and multiple assemblies having inputs and outputs. Modular PLCs 1 of this type may be easily expanded by adding assemblies. Which assemblies need to be integrated into PLC 1 depends on the complexity of the process and the complexity of the structure of the automation system. In today's automation systems, PLC 1 is also usually no longer an independent system, but instead PLC 1 is connected to the Internet or intranet via corresponding interfaces. This means that PLC 1 is part of a network, via which or from which PLC 1 may receive information, instructions, programming, etc. For example, PLC 1 may receive information about materials supplied to the process over a connection to a computer located in the intranet or Internet, so that the process may be optimally controlled, for example by the knowledge of the number or condition thereof. It is also conceivable that PLC 1 is controlled by a user by an access from the intranet or Internet. For example, a user may access PLC 1 with the aid of a computer, also referred to as a master computer, and check, modify or correct its user programming. Accordingly, the access to PLC 1 is possible from one or multiple remote control rooms or control centers. The master computer may, if necessary, have visualization devices for representing process workflows.

To control the process of the automation system, PLC 1 is connected to automation devices. Bus systems are used for these connection to minimize the wiring complexity. In the exemplary embodiment illustrated in FIG. 1, PLC 1 is connected to a local bus master 3 of a lower-level local bus system with the aid of a higher-level bus 2, which may be a field bus in the exemplary embodiment shown here. However, not only a local bus master 3 of a local bus, as in the exemplary embodiment illustrated here, but also other arbitrary participants which are configured to communicate with PLC 1, may be connected to higher-level bus 2.

In the exemplary embodiment illustrated here, higher-level bus 2 is connected to local bus master 3. For this purpose, local bus master 3 includes a first interface 4, which is configured in such a way that it is connectable to higher-level bus 2. For this purpose, interface 4 may have, for example, a receptacle in the form of a socket, and higher-level bus 2 may have a plug, which may be received by the socket. The plug and the socket may be, for example, a modular plug and a modular socket, i.e. each wire of higher-level bus 2 is electrically or optically connected to a connection in the modular socket. However, those skilled in the art are aware of other possibilities for configuring an interface 4, so that local bus master 3 may be electrically or optically connected to higher-level bus 2. Those skilled in the art are aware of screw connections, slewing joints, lock joints or plug connections, with the aid of which an electrical or optical connection may be established. A male connector is usually received by a female mating piece. This receptacle usually not only establishes the electrical or optical connection but also ensures that the two parts are mechanically coupled and may be released from each other only by applying a certain force. However, it is also conceivable that higher-level bus 2 is fixedly wired to interface 4.

In the exemplary embodiment illustrated here, local bus master 3 includes another second interface for connecting local bus master 3 to the local bus. Data bus participants 7a, 7b, . . . , 7n are connected to or form the local bus. The local bus is advantageously designed in such a way that a data packet transmitted from local bus master 3 is transmitted through all data bus participants 7a, 7b, . . . , 7n connected to the local bus and back to local bus master 3. One data bus participant 7a, 7b, . . . , 7n always receives only one part of the data packet from its preceding data bus participant 77a, 7b, . . . , 7n. After a period of time, in which the data contained in this part may be processed by data bus participant 7a, 7b, . . . , 7n, the part is forwarded to subsequent data bus participant 7a, 7b, . . . , 7n, and a new part of the data packet is simultaneously received from preceding data bus participant 7a, 7b, . . . , 7n. In this way, all parts of the data packet sequentially pass through all data bus participants 7a, 7b, . . . , 7n. The local bus is advantageously designed in an annular structure. Local buses of this type may also be referred to as ring bus 6. Alternatively, the local bus may also be provided with a restiform or star-shaped design or may have a combination or mixed form of the aforementioned designs. The transmission and receipt of the data packets are effectuated via the second interface of local bus master 3. In the exemplary embodiment illustrated here, the second interface is divided into a first part 5a and a second part 5b. First part 5a of the second interface establishes the downstream connection in ring bus 6, and second part 5b of the second interface establishes the upstream connection in ring bus 6.

Ring bus 6, whose data transmission direction is shown by arrows in the exemplary embodiment illustrated in FIG. 1, includes data bus participants 7a, 7b, . . . , 7n in the exemplary embodiment illustrated here. In the exemplary embodiment illustrated here, these data bus participants 7a, 7b, . . . , 7n each include an interface 8 for receiving data from an upstream or preceding data bus participant 7a, 7b, . . . , 7n. In the case of data bus participant 7a, it receives data from preceding local bus master 3 via interface 8. The data transmitted on local bus 6 may also be referred to as local bus data. In the exemplary embodiment illustrated here, data bus participants 7a, 7b, . . . , 7n each further include an interface 9 for forwarding data to a downstream or subsequent data bus participant 7a, 7b, . . . , 7n. In the case of data bus participant 7a, it transmits this data to subsequent data bus participant 7b via interface 9. Interfaces 8 and 9 are used to propagate data in the downstream direction of ring bus 6, i.e. away from local bus master 3. In addition, in this exemplary embodiment, data bus participants 7a, 7b, . . . , 7n also include interfaces 10 and 11 for propagating data in the upstream direction of ring bus 6, i.e. in the direction of local bus master 3. In the case of data bus participant 7a, interface 10 is configured to receive data from downstream or subsequent data bus participant 7b, and interface 11 is configured to forward data to the upstream or preceding data bus participant, local bus master 3 in this case. It may thus be said that interfaces 9 and 11 are transmitter interfaces, while interfaces 8 and 10 are receiver interfaces.

In the exemplary embodiment illustrated here, the connections of the interfaces and PLC 1 or data bus participants 7a, 7b, . . . , 7n are implemented with the aid of cables or circuit boards for direct or indirect contacting with the aid of electrical contacts. Another alternative is that the individual connections are established wirelessly, and the interfaces provide the necessary conversions to the wireless standards used.

Although local bus master 3 and individual data bus participants 7a, 7b, . . . , 7n are shown spaced a distance apart in the exemplary embodiment illustrated here, local bus master 3 is thus disposed decentrally from data bus participants 7a, 7b, . . . , 7n, those skilled in the art are aware of the fact that data bus participants 7a, 7b, . . . , 7n and local bus master 3, which also represents a data bus participant of ring bus 6, may also be connected directly to each other. For example, contacts of the one data bus participant may engage with corresponding receptacles or receiving contacts of a directly adjacent data bus participant to thereby establish an electrical connection between the data bus participants, so that data may be transmitted in the downstream and upstream directions. For example, data bus participants 7a, 7b, . . . , 7n may have receptacles on the side facing away from the master and contacts on the side facing the master. If data bus participants 7a, 7b, . . . , 7n are then arranged one after the other accordingly, the contacts of the one data bus participant 7a, 7b, . . . , 7n each engage with the receptacles of the other data bus participant 7a, 7b, . . . , 7n, and an electrical connection may be generated. Local bus master 3 then correspondingly has contacts on the side, which engage with the receptacles of first data bus participant 7a to thereby generate an electrical connection between interfaces 5a and 8 and interfaces 5b and 11. However, those skilled in the art are aware of even other ways, e.g. push contacts, knife-blade and tuning-fork contacts, for two directly adjacent data bus participants 7a, 7b, . . . , 7n to establish an electrical or optical connection.

In the case that data bus participants 7a, 7b, . . . , 7n and local bus master 3 are to be connected directly to each other, they may also have mechanical receptacles or mechanical fastener, with the aid of which individual data bus participants 7a, 7b, . . . , 7n and local bus master 3 may be connected to each other. For example, a data bus participant 7a, 7b, . . . , 7n may have a projection on one side and a recess on the other side. If data bus participants 7a, 7b, . . . , 7n are then arranged one after the other, a projection engages with a recess of the other data bus participant 7a, 7b, . . . , 7n, so that a mechanical coupling occurs. To easily arrange data bus participants 7a, 7b, . . . , 7n one after the other, they may be arranged on a shared receptacle, for example a DIN rail. Data bus participants 7a, 7b, . . . , 7n may have corresponding fasteners for fastening on the DIN rail. Alternatively or additionally, data bus participants 7a, 7b, . . . , 7n may also have, for example, detachably connectable fasteners, with the aid of which data bus participants 7a, 7b, . . . , 7n may be fastened either to the DIN rail or to another receptacle. For this purpose, the detachably connectable fasteners may be replaceable, and a corresponding fastener for the desired receptacle may be connected to data bus participants 7a, 7b, . . . , 7n for the desired receptacle, so that the latter may be fastened to the desired receptacle.

Figure 3:
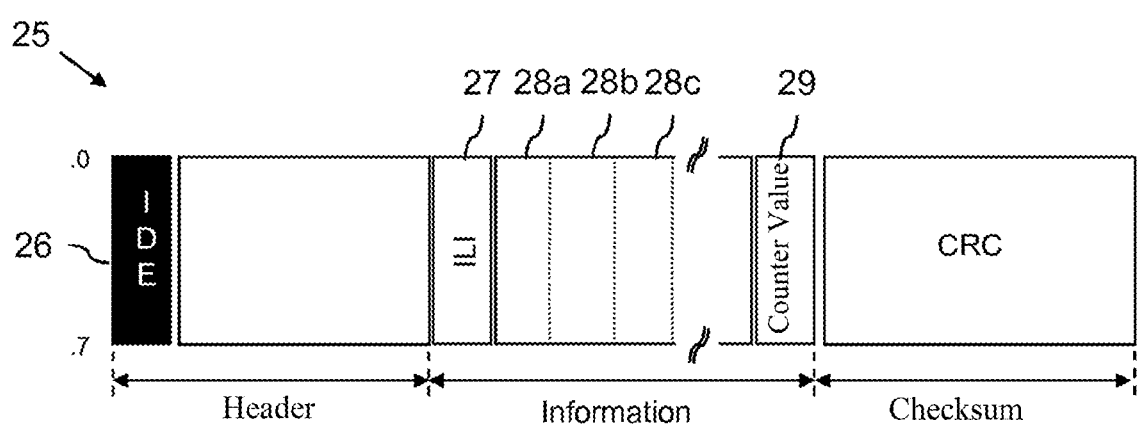
FIG. 3 shows a schematic representation of an isochronous data packet made up of symbols, some symbols carrying process data.

Moreover, in the exemplary embodiment illustrated in FIG. 1, data bus participants 7a, 7b, . . . , 7n also include a processing unit 12, which is made up of, for example, a processing component and a logic unit, which are illustrated in greater detail in FIG. 3. Processing unit 12 may also be referred to as the overall circuit of the data bus participant. That is, processing unit 12 receives data via inputs 8 and 10 and outputs data at outputs 9 and 11. Processing unit 12 may furthermore receive and output data from/at inputs/outputs 13 and 14. Processing unit 12 also has access to a memory 12' of data bus participant 7a, 7b, . . . , 7n, in which, for example, data, process data or instruction lists are stored.

Processing unit 12 may also be referred to as the overall circuit of the data bus participant. That is, processing device 12 receives data via inputs 8 and 10 and outputs data at outputs 9 and 11. Processing device 12 may furthermore receive and output data from/at inputs/outputs 13 and 14. Processing unit 12 also has access to a memory 12' of data bus participant 7a, 7b, . . . , 7n, in which, for example, data, process data or instruction lists are stored.

Processing unit 12 may be configured to process received data and to output data. Data to be processed may be received either from a preceding data bus participant or from inputs 13 of data bus participant 7a, 7b, . . . , 7n. Inputs 13 of data bus participant 7a, 7b, . . . , 7n may be connected to sensors 15, which transmit, for example, measured data, status data, etc. Processed data may be output either at a preceding data bus participant or at inputs 14 of data bus participant 7a, 7b, . . . , 7n. Outputs 14 of data bus participant 7a, 7b, . . . , 7n may be connected to actuators 16, which carry out a certain action, for example with the aid of the data directed to them. If a processing of the data is also to take place in the upstream direction, data may also be received from a subsequent data bus participant 7a, 7b, . . . , 7n, and processed data may be transmitted to a preceding data bus participant 7a, 7b, . . . , 7n.

For the sake of simplicity, data bus participants 7a, 7b, . . . , 7n in the exemplary embodiment illustrated here are shown with only one input 13 and one output 14, and also only data bus participant 7b is connected to sensor 15 and actuator 16. However, those skilled in the art are aware that data bus participants 7a, 7b, . . . , 7n may have a plurality of inputs and outputs 13 and 14 and be connected to a plurality of different sensors 15 and actuators 16. The characterizing feature of sensors 15 is that sensors 15 receive data or signals and transmit them to data bus participants 7a, 7b, . . . , 7n, while actuators 16 receive data or signals from data bus participants 7a, 7b, . . . , 7n and carry out an action based on this data or these signals.

Alternatively, interfaces 8, 9, 10 and 11 may be integrated into a module unit, and data bus participants 7a, 7b, . . . , 7n may be mounted on these module units. The module units may also be referred to as base elements of ring bus 6. The ring bus structure is structured by the module units, and data bus participants 7a, 7b, . . . , 7n are exchangeable, so that ring bus 6 may be constructed with arbitrary data bus participants 7a, 7b, . . . , 7n. With the aid of the module units, it is also ensured that, even if one data bus participant 7a, 7b, . . . , 7n is removed, the communication between remaining data bus participants 7a, 7b, . . . , 7n is not interrupted, because the communication takes place via the still present module units.

Data bus participants 7a, 7b, . . . , 7n illustrated in this exemplary embodiment are also frequently referred to as I/O modules, due to their inputs and outputs 13, 14, which are connectable to sensors 15 and actuators 16. Although data bus participants 7a, 7b, . . . , 7n in the exemplary embodiment illustrated here are shown as being spatially separated from sensors 15 and actuators 16, sensors 15 and actuators 16 may also be integrated into the I/O module.

Ring bus 6 illustrated in the exemplary embodiment shown here is based on a cycle frame communication. A cycle frame may be defined, for example, as a recurring (cyclical), preferably equidistant, time interval, within which data is transmittable on ring bus 6. The cycle frame has, for example, at least one first identifier (SOC) and a time range for transmitting data. Multiple first identifiers (SOC) of consecutive cycle frames are advantageously spaced equidistantly apart in time. The aforementioned time range is provided for transmitting the data, which may be transmitted within the cycle frame in the form of data packets. First identifier (SOC) and the data packets are transmitted via ring bus 6 and pass through all data bus participants 7a, 7b, . . . , 7n. The cycle frame is advantageously initiated by local bus master 3 in ring bus 6. The first identifier (SOC) is transmittable separately, i.e. as an independent symbol, or it may be advantageously contained in a start data packet (SOC packet).

Figure 2:
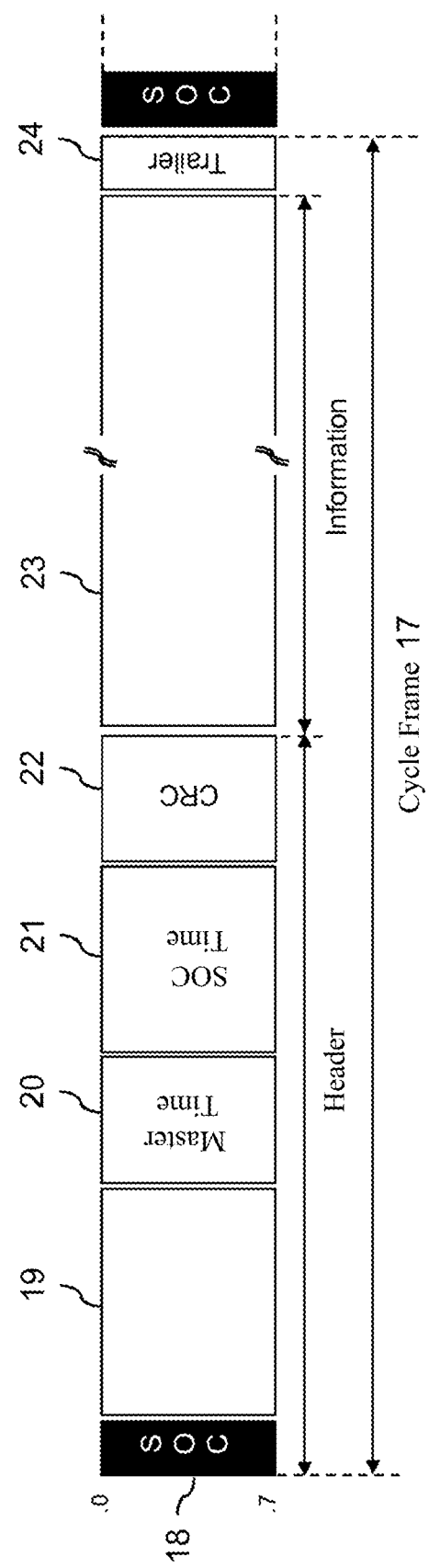
FIG. 2 shows a schematic representation of a cycle frame.

One or multiple data packets or none at all may be transmitted within the time range of the cycle frame. Idle data is advantageously inserted into a cycle frame, in particular adjacent to at least one data packet. The transmission of the data packets and/or the idle data advantageously induces an uninterrupted signal on ring bus 6. The signal makes it possible for data bus participants 7a, 7b, . . . , 7n to be synchronized thereto in time. Within a cycle frame, idle data is also advantageously at the end of the cycle frame (trailer). The trailer has a variable length and follows the time range for data transmission, preferably up to the following first identifier (SOC) of the next cycle frame. FIG. 2 shows an example of a corresponding cycle frame.

Each data packet is transmitted in the downstream direction from local bus master 3 to first data bus participant 7a of ring bus 6. The latter receives a first part of the data packet via interface 8. Such a part of the data packet is referred to below as a piece, unit or symbol. Data bus participant 7a then carries out a processing of the part and then forwards the part to next data bus participant 7b via interface 9; first data bus participant 7a preferably simultaneously receives a second part of the data packet, etc. The size of the parts of the data packet, i.e. the segmentation of the data packet, depends on the receiving capacity of data bus participants 7a, 7b, . . . , 7n; for example, a fixed number of bits, for example 8 bits, of the data packet may be simultaneously present at data bus participant 7a, 7b, . . . , 7n for processing. If the data transmission on local bus 6 is serial, interfaces 8 and 10 may be adapted to carry out a serial-to-parallel conversion, and interfaces 9 and 11 may be adapted to carry out a parallel-to-serial conversion. For this purpose, interfaces 8, 9, 10, 11 may have corresponding registers. Interfaces 8, 9, 10, 11 may also be adapted to carry out any encoding and decoding actions that may be necessary. For example, an 8b10b code may be used on the local bus, whose conversion may be effectuated by interfaces 8, 9, 10 and 11.

The data packet passes through data bus participants 77a, 7b, . . . , 7n in units, in pieces or in parts, for example in parts or symbols of 8 bits. The part of the data packet which was processed by the last data bus participant, data bus participant 7n in the exemplary embodiment illustrated here, then passes through ring bus 6 in the upstream direction, so that the parts are again transmitted upstream through all data bus participants 7a, 7b, 7n in the direction of local bus master 3, starting from last data bus participant 7n. For this purpose, last data bus participant 7n either has a switchable bridge, which connects interface 9 to interface 10, or a switchable bridge is connected to last data bus participant 7n and performs the function of conducting the parts of the data packet from interface 9 to interface 10. Alternatively, interface 10 of data bus participant 7n may also be connected directly to interface 5b of local bus master 3 with the aid of a bypass line.

In the upstream direction, the units of the data packet or the data packets, as in the exemplary embodiment illustrated here, may be looped through individual data bus participants 7a, 7b, . . . , 7n back to local bus master 3 without an additional processing of the units taking place. However, it is also conceivable that another processing of the units of the data packet takes place in the upstream direction, so that the data packet may be processed twice, once in the downstream direction to last data bus participant 7n and once in the upstream direction to local bus master 3. For example, a processing by signal regeneration and/or phase shifting may take place in the upstream direction.

In processing the data packets in the downstream direction, i.e. away from local bus master 3, or in the upstream direction, i.e. toward local bus master 3, the processing is effectuated with the aid of instruction lists, the instruction lists containing sets of instructions, which may be carried out by processing unit 12 of data bus participants 7a, 7b, . . . , 7n. The instruction lists themselves may be sent from local bus master 3 to individual data bus participants 7a, 7b, . . . , 7n in an initialization phase or be advantageously sent to data bus participants 7a, 7b, . . . , 7n during the communication in progress, so that a programming of data bus participants 7a, 7b, . . . , 7n takes place without interrupting the communication.

Figure 4:
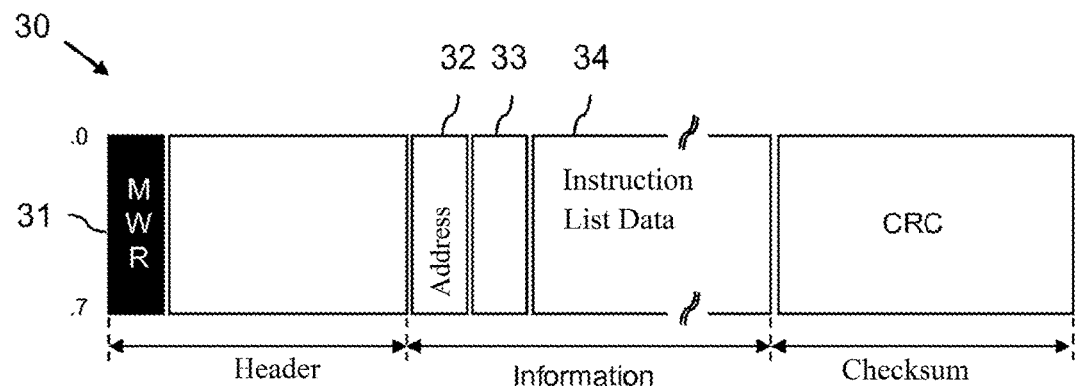
FIG. 4 shows a schematic representation of an asynchronous data packet made up of symbols, some symbols carrying management data.
Figure 5:
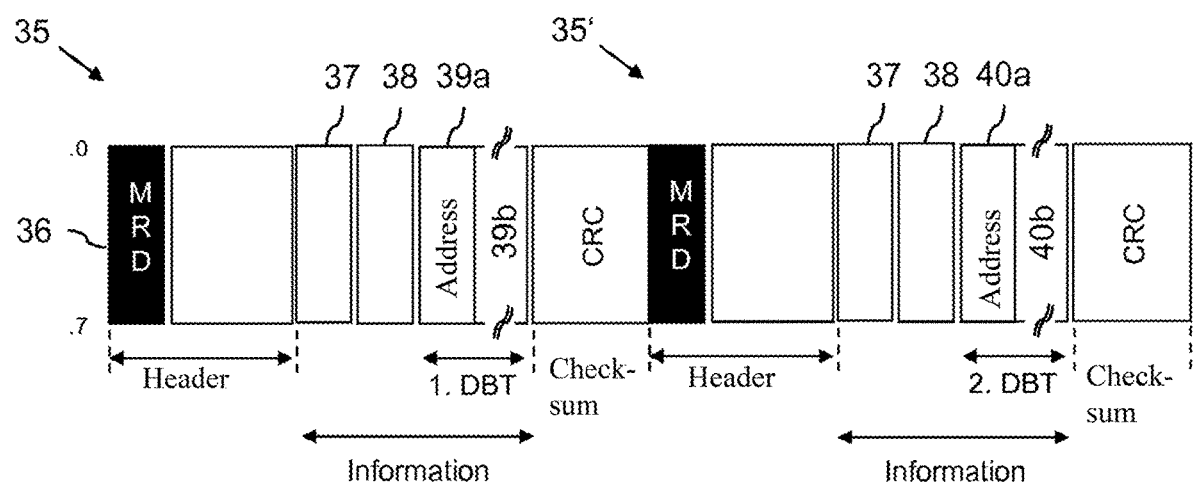
FIG. 5 shows a schematic representation of another asynchronous data packet made up of symbols, some symbols carrying management data.

Which of the instruction lists data bus participants 7a, 7b, . . . , 7n should use may be communicated to data bus participants 7a, 7b, . . . , 7n based on an instruction list index. This instruction list index tells the data bus participants which stored instruction list should be used. An instruction list index may also be assigned to an instruction list or vice versa, so that the instruction list to be used may be identified with the aid of the instruction list index. For this purpose, the instruction list index has a value, which is assigned to an instruction list; for example, the value points to a certain instruction list or to its storage location. For this purpose, the value itself may be the memory address where the instruction list is stored or where at least one first instruction of the instruction list is stored. Alternatively or additionally, the value may also point to a memory area, in which the corresponding instruction list is stored. In the aforementioned cases, one may also speak of a direct assignment. The value of the instruction list index may also be used, for example, as an input of a lookup table (LUT). The value of the instruction list index is the input value of the lookup table. The output value of the lookup table may be the memory address of the first instruction in the associated instruction list or otherwise identify the instruction list. The lookup table may be stored as software or hardware in the form of, for example, logic units, and indicate a unique conversion of an input value into an output value, the output value providing an indication of the instruction list to be used. The way in which a correlation is established between the instruction list index and the instruction list depends on the lookup table. When using a lookup table, one may also speak of an indirect assignment. In the case of the direct as well as indirect assignment, however, the instruction list to be used by the data bus participant is uniquely identifiable, i.e. locatable, via the instruction list index. The instruction list index may be inserted into the data packet before the local bus data to be processed, so that data bus participants 7a, 7b, . . . , 7n may use the corresponding instruction list according to the sequence of the local bus data in the data packet. The instruction lists have instructions, which are adapted to the sequence of the local bus data in the data packet. The instruction lists may have a "SKIP" instruction, for example for local bus data which is not directed to data bus participants 7a, 7b, . . . , 7n, i.e. instructing data bus participants 7a, 7b, . . . , 7n to skip the corresponding part of the data packet, while the instruction list for local bus data which is directed to data bus participants 7a, 7b, . . . , 7n may contain corresponding instructions for processing the local bus data. The data packets for transmitting the process data and the management data of data bus participants 7a, 7b, . . . , 7n are illustrated in FIGS. 3 through 5.

First of all, however, a cycle frame 17 is schematically illustrated in FIG. 2. A unique first identifier 18 is provided at the start of cycle frame 17 as part of an SOC (Start of Cycle) packet. First identifier 18 is a bit pattern, which defines the beginning of cycle frame 17. Following identifier 18, multiple parts 19, 20, 21, 22 of the SOC packet are arranged chronologically within the SOC packet, which may be used, for example, for the control and time synchronization between local bus master 3 and data bus participants 7a, 7b, . . . , 7n. For example, a field 19 is chronologically arranged in the SOC packet, in which at least one value is present for encrypting and decrypting the data transmitted on local bus 6. The SOC may furthermore have a field 20, which contains the timing of local bus master 3, so that data bus participants 7a, 7b, . . . , 7n may be synchronized hereto. In addition, the SOC packet may contain a field 21 as a time stamp, which indicates when first identifier 18 was transmitted from local bus master 2. The SOC packet may also contain a first checksum in field 22, which makes it possible to check whether the data transmitted in fields 19, 20, 21, 22 of the SOC packet was received without errors. Moreover, an information time range 23 is chronologically arranged within cycle frame 17. Isochronous and asynchronous data is transmitted to the data bus participants within this information time range 23. Within cycle frame 17, a time range (trailer) may be provided with idle data at the end cycle frame 17. Time range 24 may have a variable length and follow the information time range for data transmission. The length of time range 24 is preferably extended up to following first identifier 18 of next cycle frame 17. Trailer 24 preferably includes idle data, i.e. data which does not induce a control or regulation at data bus participants 7a, 7b, . . . , 7n and yet permits a synchronization.

Within information time range 23 for data transmission, isochronous data, for example, may be contained in isochronous data packets and asynchronous data in asynchronous data packets. FIG. 3 shows an example of an isochronous data packet, and FIGS. 4 and 5 each show an example of an asynchronous data packet, with the aid of which either a special data bus participant 7a, 7b, . . . , 7n or a plurality of data bus participants 7a, 7b, . . . , 7n may be addressed.

Isochronous data packet 25 shown in FIG. 3 is made up of a header part, an information part and a checksum part. The header part contains a field 26, which contains a unique bit pattern IDE, which may also be referred to as a code word or packet identifier. The number and design of bit patterns depend on the encoding used on ring bus 6. It is only important that data bus participants 7a, 7b, . . . , 7n may recognize the type of data packet based on the bit pattern in field 26. In the exemplary embodiment illustrated here, data bus participants 7a, 7b, . . . , 7n have knowledge of the fact that, if a field 26 having a bit pattern IDE is received, the data packet is an isochronous data packet 25 which carries process data 28a, 28b, 28c.

The header part may also contain additional information, which indicates, for example, whether isochronous data packet 25 is moving in the downstream direction or upstream direction. For this purpose, for example, last data bus participant 7n may write an item of information to the header part indicating that isochronous data packet 25 has already passed this data bus participant 7n and was transmitted back in the direction of local bus master 3. Furthermore, the header may also contain an item of information about the length of isochronous data packet 25 so that data bus participants 7a, 7b, . . . , 7n may check the integrity of isochronous data packet 25 or have knowledge of how many parts of isochronous data packet 25 are still being received by data bus participant 7a, 7b, . . . , 7n. However, those skilled in the art are also aware of other fields, which may be present in a header part of an isochronous data packet 25, which may be used, for example, by data bus participants 7a, 7b, . . . , 7n or control or error identification.

The information part of isochronous data packet 25 may have an instruction list index field 27, ILI as the first item, which indicates which instruction list is to be used by data bus subscribers 77a, 7b, . . . , 7n. For example, during normal operation of ring bus 6, it may be provided that all data bus participants 7a, 7b, . . . , 7n use their first instruction list, while the second instruction list is to be used in the case of an error. The instruction list index may directly point to the storage location of the instruction list stored in data bus participant 7a, 7b, . . . , 7n, or the instruction list index may have a value, with the aid of which data bus participant 7a, 7b, . . . , 7n may locate the corresponding instruction list, for example via a lookup table. The information part also includes actual process data 28a, 28b and 28c.

In the exemplary embodiment illustrated here, isochronous data packet 25 is divided into symbols of 8 bits each. Isochronous data packet 25 is also received and processed by data bus participants 7a, 7b, . . . , 7n in this segmentation. That is, local bus master 3 first transmits symbol 26 to first data bus participant 7a; after a predetermined time, local bus master 3 transmits another symbol of the header part of isochronous data packet 25 to first data bus participant 7a, which, in turn, simultaneously transmits symbol 26 to second data bus participant 7b in the row of data bus participants 7a, 7b, . . . , 7n. In one advantageous embodiment, this predetermined time between transmitting and receiving the symbols of isochronous data packet 25 is dependent on a timing of the local bus, in particular a fixed number of cycles, for example two cycles.

Moreover, isochronous data packet 25 also has a field 29 in the information part, which may be designed as a counter and which may be incremented or decremented by each data bus participant 7a, 7b, . . . , 7n through which this part of isochronous data packet 25 has already been conducted. The counter value of field 29 may be used by local bus master 3 to check whether isochronous data packet 25 has passed through all data bus participants 7a, 7b, . . . , 7n.

Those skilled in the art are aware that the exemplary embodiment of isochronous data packet 25 illustrated here is to be understood only as an example, and the design of isochronous data packet 25 may otherwise be directed to the needs and requirements of the specific local bus where it is implemented.

FIG. 4 shows a schematic representation of an asynchronous data packet 30, for example for programming a data bus participant 7a, 7b, . . . , 7n without the communication in progress having to be interrupted. Asynchronous data packet 30 may be transmitted during a cyclical communication in progress, separately in time from isochronous data packets, and be used, for example, to program a data bus participant 7a, 7b, . . . , 7n. The programming of the one data bus participant 7a, 7b, . . . , 7n takes place with the aid of instruction list information, which is transmitted to data bus participant 7a, 7b, . . . , 7n to be programmed with the aid of asynchronous data packet 30.

Asynchronous data packet 30 is made up of a general header part, an information part and a checksum part. The header part contains a field 31, which contains a unique bit pattern MWR, which may also be referred to as a code word or identifier. Data bus participants 7a, 7b, . . . , 7n have knowledge of the fact that, when bit pattern MWR occurs, data is made available to data bus participants 7a, 7b, . . . , 7n. This data may be the instruction lists for data bus participants 7a, 7b, . . . , 7n for the purpose of programming data bus participants 7a, 7b, . . . , 7n. Although the instruction lists are mentioned here as an example, those skilled in the art are aware that other data may also be contained in asynchronous data packet 30, with the aid of which data bus participants 7a, 7b, . . . , 7n may be programmed. The header of asynchronous data packet 30 may also contain additional information, which is needed for control or error detection.

The information part of asynchronous data packet 30 contains a field 32, in which the address of data bus participant 7a, 7b, . . . , 7n to be addressed is stored. Only data bus participant 7a, 7b, . . . , 7n whose address corresponds to the address stored in field 32 reads instruction list data 34 of the information part of asynchronous data packet 30. The information part may also have another field 33, which may be used by corresponding data bus participant 7a, 7b, . . . , 7n whose address is stored in field 31 for the purpose of error detection, error propagation, or this field 32 may contain instructions as to where instruction list data 34 is to be stored. Instruction list data 34 may contain at least one instruction list or multiple instruction lists. After the storage of the instruction list or the instruction list in particular data bus participant 7a, 7b, . . . , 7n, it may be said that the programming of particular data bus participant 7a, 7b, . . . , 7n has been completed. The instruction lists include sets of instructions, which define the processing to be carried out by data bus participants 7a, 7b, . . . , 7n. This is, for example, the processing to be carried out using process data 28a, 28b, 28c of an isochronous data packet 25. If asynchronous data packet 30 is transmitted before isochronous data packet 25 within cycle frame 17, data bus participants 7a, 7b, . . . , 7n may be programmed before receiving process data 28a, 28n, 28c; this may take place, for example, in the same cycle frame or in two different cycle frames. That is, before process data 28a, 28b, 28c arrives at particular data bus participants 7a, 7b, . . . , 7n, the latter may be supplied with information on how process data 28a, 28b, 28c is to be processed. In the exemplary embodiment illustrated here, instruction list data 34 may be transmitted to each data bus participants 7a, 7b, . . . , 7n with the aid of asynchronous data packet 30 This instruction list data 34 may be stored in particular data bus participants 7a, 7b, . . . , 7n in such a way that it may be located via an instruction list index. Isochronous data packet 25 contains an instruction list index 27, which points to exactly one stored instruction list in each data bus participant 7a, 7b, . . . , 7n, which is to be used for processing process data 28a, 28b, 28c.

Although, in the exemplary embodiment of asynchronous data packet 30 illustrated here, the latter may be addressed only to one data bus participant 7a, 7b, . . . , 7n via field 32, those skilled in the art are aware that asynchronous data packet 30 may also have multiple addresses, broadcast or multicast addresses, so that instruction list data 34 may be addressed not only to one data bus participant 7a, 7b, . . . , 7n but also to multiple data bus participants 7a, 7b, . . . , 7n. Those skilled in the art are also aware that the exemplary embodiment of asynchronous data packet 30 illustrated here is to be understood only as an example, and the design of asynchronous data packet 30 may otherwise be directed to the needs and requirements of the specific local bus where it is implemented.

FIG. 5 shows a schematic representation of another asynchronous data packet 35, for example for querying multiple data bus participants 7a, 7b, . . . , 7n without the communication in progress having to be interrupted. Asynchronous data packet 35 may be embedded in a sequence of data packets of the ongoing cyclical communication.

Asynchronous data packet 35 is made up of a general header part, an information part and a checksum part. The header part contains a field 36, which includes a unique bit pattern MRD, which may also be referred to as a code word or identifier. Data bus participants 7a, 7b, . . . , 7n have knowledge of the fact that, when bit pattern MRD occurs, data is read out to data bus participants 7a, 7b, . . . , 7n. The header of asynchronous data packet 35 may also contain additional information, which is needed for control or error detection.

The information part of asynchronous data packet 35 in the exemplary embodiment illustrated here contains two fields 37 and 38, which may be used for control purposes. These fields may indicate, for example, which information is to be requested and the priority of asynchronous data packet 35. It is clear to those skilled in the art that an arbitrary number of control fields or no such fields at all may be contained in the information part.

The master transmits asynchronous data packet 35 with an area, in which data bus participants 7a, 7b, . . . , 7n may each write their information. In the illustrated exemplary embodiment, the asynchronous data packet has a first field 39a, in which the address of data bus participant 7a, 7b, . . . , 7n is located. Data bus participant 7a, 7b, . . . , 7n associated with the address writes the information to be transmitted in the one or more the following fields 39b. In the exemplary embodiment illustrated here, the address in field 39a is the address of first data bus participant 7a. This latter additionally writes the information to be transmitted to subsequent field 39b. Information of a second data bus participant 7a, 7b, . . . , 7n may be requested with the aid of another data packet 35', which has the address of second data bus participant 7a, 7b, . . . , 7n, from which information is to be requested, for example in field 40a. Second data bus participant 7a, 7b, . . . , 7n may then write its information to be transmitted in field 40b. etc. Second data bus participant 7a, 7b, . . . , 7n does not have to be one which directly follows first data bus participant 7a, but it may be one which is situated at an arbitrary location after the first data bus participant, whose address, however, matches the address contained in Field 40a.

Those skilled in the art are aware that the exemplary embodiment of asynchronous data packet 35 illustrated here is to be understood only as an example, and the design of asynchronous data packet 35 may otherwise be directed to the needs and requirements of the specific local bus where it is implemented.

Figure 6:
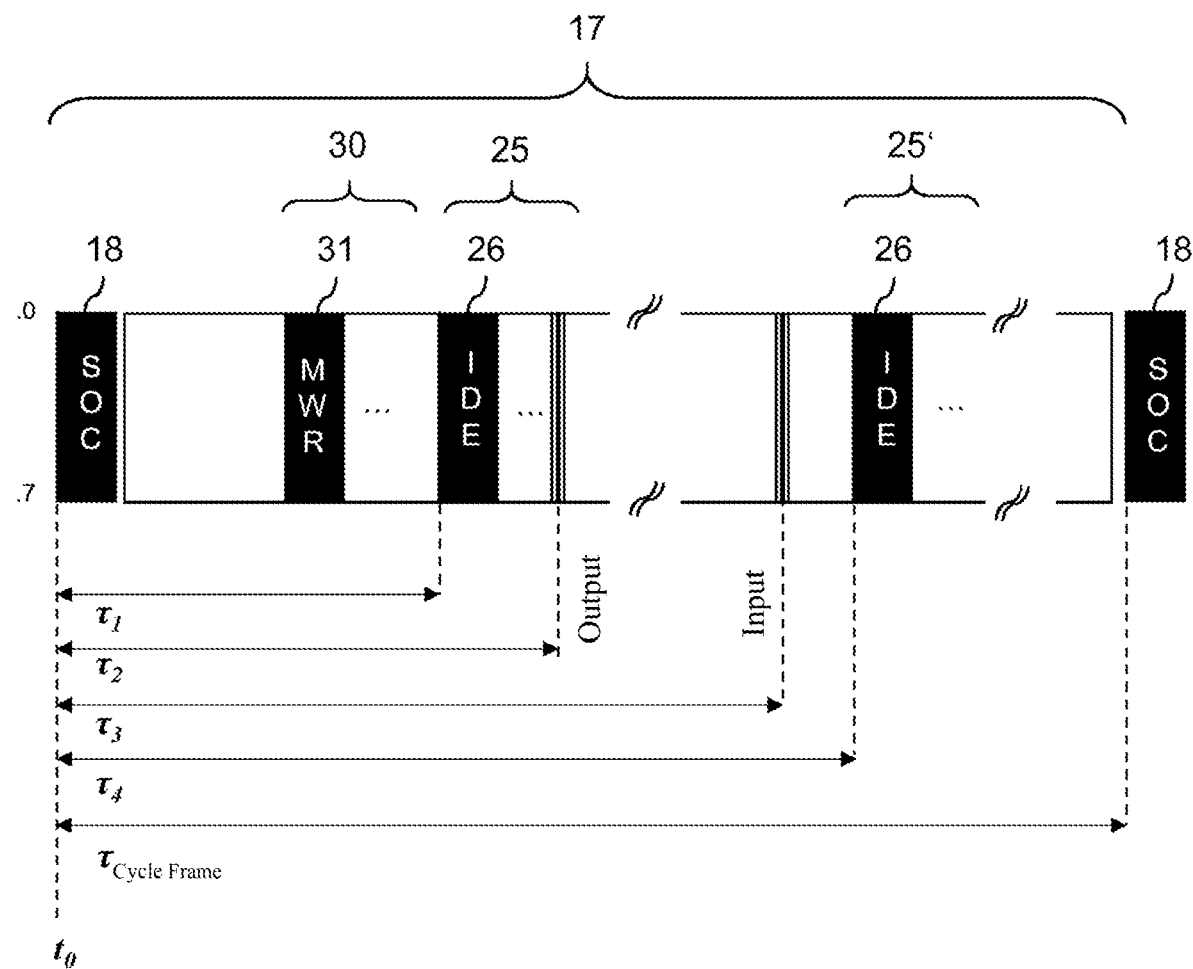
FIG. 6 shows an example of a time sequence of asynchronous and isochronous data packets within a cycle frame.

FIG. 6 shows an example of a time sequence of asynchronous and isochronous data packets 25 and 30, as shown, for example, in FIGS. 3 and 4, within a cycle frame 17, as illustrated, for example, in FIG. 2. For the sake of simplicity, cycle frame 17 as well as data packets 25, 30 are each marked only by their unique bit patterns SOC 18 for the start of cycle frame 17, MWR 31 for the start of asynchronous data packet 30, IDE 26 for the start of first isochronous data packet 25 and IDE 26 for the start of second isochronous data packet 25. In the exemplary embodiment illustrated here, an asynchronous data packet 30, which is marked by unique bit pattern MWR 31, is transmitted before first isochronous data packet 25, which is marked by unique bit pattern IDE 26.

Data bus participants 7a, 7b, . . . , 7n may be programmed with the aid of this asynchronous data packet 30 and thus, instruction list data may be transmitted to them, for example, with the aid of asynchronous data packet 30. This data may contain instruction lists, each instruction in the list being able to be adapted to process a processing of process data 28 contained in subsequent isochronous data packet 25.

Bit pattern IDE 26, which is displayed by isochronous data packet 25, follows in a time interval $\tau_1$ from first bit pattern SOC 18. That is, local bus master 3 transmits bit pattern SOC 18 on local bus 6 at time $t_0$, and local bus master 3 transmits bit pattern IDE 26 in time interval $\tau_1$, viewed from $t_0$, and subsequently the symbols of isochronous data packet 25. Since data bus participants 7a, 7b, . . . , 7n are adapted in such a way that they have the individual symbols of cycle frame 17 in place only for a defined, predetermined time before the symbols are forwarded, and if this time is constant for all data bus participants 7a, 7b, . . . , 7n, first time interval $\tau_1$ between bit pattern SOC 18 and bit pattern IDE 26 does not change. That is, if ith data bus participant 7i forwards bit pattern SOC 18 to subsequent data bus participant 7i+1 at time $\tau_1$ data bus participant 7i also transmits bit pattern IDE 26 at time $\tau_1 + \tau_1$ etc., where i is $\in \{a, \ldots, n\}$. First time interval $\tau_1$ is ascertained or determined by local bus master 3 in such a way that all symbols of data packet 25 have arrived at particular data bus participants 7a, 7b, . . . , 7n before the output point in time. The output point in time is a point in time at which all data bus participants 7a, 7b, . . . , 7n forward process data 28 contained in isochronous data packet 25 to their outputs 14, for example to connected actuators 16, that is, all data bus participants 7a, 7b, . . . , 7n simultaneously. In other words, the output point in time is a fixed point in time, which is in a certain time interval, in this case $\tau_2$, from the transmission of bit pattern SOC 18 by local bus master 3. The output point in time may be determined, for example, by local bus master 3. Local bus master 3 is adapted in such a way that it selects first time interval $\tau_1$, i.e. the point in time when isochronous data packet 25 is transmitted, in such a way that all data bus participants 7a, 7b, . . . , 7n have their process data 28 in place before output point in time is reached. That is, $\tau 1+\tau_{data\ packet} \leq \tau_2$ applies, $\tau_{data\ packet}$ indicating the duration until all data bus participants 7a, 7b, . . . , 7n have received their particular process data 28 from isochronous data packet 25 for their outputs. Those skilled in the art are aware that this duration is dependent on the length of isochronous data packet 25 and/or the number of data bus participants 7a, 7b, . . . , 7n in local bus 6 and/or on the distribution of the process data in isochronous data packet 25 and/or on a duration of the provision of the data within a data bus participant. If, for example, process data 28 of last data bus participant 7n is also transmitted as the last data in isochronous data packet 25, this process data must first pass through all other data bus participants 7a, 7b, . . . , 7n−1 before arriving at last data bus participant 7n. That is, the other data bus participants 7a, 7b, . . . , 7n−1 have already previously received their process data 28 and must wait until last data bus participant 7n also has received its process data 28 before an output may occur. In this case, the duration $\tau_{data\ packet}$ corresponds to the time which isochronous data packet 25 needs to pass through entire local bus 6. It is clear to those skilled in the art that, if process data 28 is contained in isochronous data packet 25 in the opposite sequence to the arrangement of data bus participants 7a, 7b, . . . , 7n, duration $\tau_{data\ packet}$ is the shortest. That is, if isochronous data packet 25 contains process data 28 for last data bus participant 7n as the first data and process data 28 for data bus participant 7a as the last data, in one exemplary embodiment of the invention, all data bus participants 7a, 7b, . . . , 7n receive their particulate process data 28 at the same time, and no data bus participant 7a, 7b, . . . , 7n has to wait. This is advantageous, in particular, if no CRC must be carried out by data bus participants 7a, 7b, . . . , 7n over entire isochronous data packet 25. By knowing the number of data bus participants 7a, 7b, . . . , 7n and possibly by knowing the distribution of process data 28 within isochronous data packet 25, local bus master 3 may ascertain first time interval $\tau_1$ in this way and establish that $\tau_1+\tau_{data\ packet} \leq \tau_2$.

Similarly to the output point in time, there may also be a defined or fixed input point in time, i.e. a point in time at which process data 28 is present at inputs 13 of data bus participants 7a, 7b, . . . , 7n, for example those of connected sensors 15. Local bus master 3 my have knowledge of this point in time, which is a third interval $\tau_3$ remote from the transmission of bit pattern SOC 18. Local bus master 3 may be adapted to transmit another isochronous data packet 25 on local bus 6 at a fourth time interval $\tau_4$ from bit pattern SOC 18. This additional isochronous data packet 25 is present at data bus participants 7a, 7b, . . . , 7n in such a way that, after the processing of process data 28 at input point in time, they are able to write processed process data 28 to the symbol of additional isochronous data packet 25 received by them in each case. Received process data 28 is thus transmitted to local bus master 3, which may forward it to PLC 1.

In one preferred embodiment, bit patterns 18, 31, 26 are delayed in a constant manner by each data bus participant. For example, first data bus participant 7a delays bit pattern SOC 18 by 10 cycles. Accordingly, second data bus participant 7b receives bit pattern SOC 18 later than first data bus participant 7a by the constant delay (10 cycles). In order for the output point in time of first data bus participant 7a to match the output point in time of second data bus participant 7b in a precisely timed manner in one advantageous embodiment of the invention, second interval $\tau_2$ for first data bus participant 7a and second data bus participant 7b differs by exactly this constant delay (10 cycles). In order for the input point in time of first data bus participant 7a to match the input point in time of second data bus participant 7b in a precisely timed manner in one advantageous embodiment of the invention, third interval $\tau_3$ for first data bus participant 7a and second data bus participant 7b differs, in particular, by exactly this constant delay (10 cycles). This correspondingly applies to subsequent data bus participants 7c etc. in the transmission chain.

In the exemplary embodiment illustrated in FIG. 6, cycle frame 17 ends before another transmission of a bit pattern SOC 18, which shows the beginning of subsequent cycle frame 17.

Although, in the exemplary embodiment illustrated in FIG. 6, the output point in time and the input point in time are predefined as fixed times, those skilled in the art are aware that the output and the input do no necessarily have to take place at one point in time but may also occur within a certain time period, which extends around the output point in time or the input point in time.

Although data is mentioned in the above description, those skilled in the art are aware that this may also include data in the singular, i.e. a single item of data.

The components of the device according to the invention described in the described exemplary embodiment as separate units, modules or interfaces may be implemented as separate hardware but are preferably integrated on the same semiconductor chip. Their function is preferably implemented by hardware made up of logic gates. For example, the units, modules or interfaces may be implemented on an FPGA/ASIC.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a local bus, in particular a ring bus, including data bus participants, the method comprising:
    transmitting a first identifier of a cycle frame, the first identifier defining a beginning of the cycle frame;
    transmitting process data and management data over the local bus, the process data and the management data being transmitted within the cycle frame,
    wherein, in a first time interval for the first identifier, at least one isochronous data packet is transmitted that contains the process data, the isochronous data packet including a second identifier different from the first identifier, the second identifier indicating that the isochronous data packet contains process data,
    wherein management data is transmitted within the cycle frame in at least one asynchronous data packet including a third identifier different from the first identifier and the second identifier, the third identifier indicating that the asynchronous data packet contains management data, the management data being transmitted separately from the process data, and
    wherein the first identifier, the second identifier and the third identifier are each a unique identifier.

2. The method according to claim 1, further comprising: ascertaining the first time interval.

3. The method according to claim 1, wherein an output point in time, which defines an output of process data at an output of the data bus participants is predefined in a second time interval for the first identifier.

4. The method according to claim 3, wherein the first time interval is based on an output point in time and a length of the at least one isochronous data packet.

5. The method according to claim 3, wherein an input point in time, which defines an input of process data at an input of the data bus participants, is predefined in a third time interval for the first identifier.

6. The method according to claim 5, further comprising: transmitting at least one additional isochronous data packet in the cycle frame in a fourth time interval for the first identifier, wherein the fourth time interval is based on the input point in time.

7. The method according to claim 1, wherein the first identifier is a start of cycle identifier.

8. The method according to claim 1, wherein the process data comprises data used on the data bus participants to induce a control of a process.

9. The method according to claim 1, wherein the process data controls setpoint values for actuators connected to the data bus participants.

10. The method according to claim 1, wherein the process data regulates limit values for recorded sensor values.

11. The method according to claim 1, wherein the management data is used to manage data bus participants.

12. The method according to claim 1, wherein the management data is used to initialize the local bus for the purpose of assigning addresses to the data bus participants or requesting addresses from the data bus participants.

13. The method according to claim 1, wherein the second identifier is a unique bit pattern.

14. The method according to claim 1, wherein the third identifier is an associated bit pattern known to the data bus participants and which is offset from the first identifier and the second identifier.

15. A local bus master of a local bus, in particular a ring bus, including data bus participants, the local bus master comprising:

a transmitter to transmit a first identifier of a cycle frame, the first identifier defining a beginning of a cycle frame,
wherein the transmitter is adapted to transmit process data and management data over the local bus, the process data and the management data being transmittable within the cycle frame,
wherein the transmitter is adapted to transmit at least one isochronous data packet containing the process data in a first time interval for the first identifier, the isochronous data packet including a second identifier different from the first identifier, the second identifier indicating that the isochronous data packet contains process data,
wherein the transmitter is adapted to transmit management data, in at least one asynchronous data packet including a third identifier different from the first identifier and the second identifier, the third identifier indicating that the asynchronous data packet contains management data, separately from the process data when management data is to be transmitted within the cycle frame, and
wherein the first identifier, the second identifier and the third identifier are each a unique identifier.

16. The local bus master according to claim 15, further comprising:

an ascertainer to ascertain the first time interval based on an output point in time, which defines an output of process data at an output of the data bus participants, wherein the output point in time is predefined in a second time interval for the first identifier.

17. The local bus master according to claim 16, further comprising:

an ascertainer to ascertain a fourth time interval for the first identifier based on an input point in time, which defines an input of process data at an input of the data bus participants, wherein the input point in time is predefined in a third time interval for the first identifier, and wherein the transmitter is adapted to transmit at least one additional isochronous data packet in the cycle frame in the fourth time interval for the first identifier.

18. The local bus master according to claim 15, further comprising:

a receiver to receive process data in a cycle frame.

* * * * *